Oct. 28, 1969    G. B. DESLOGE    3,475,597
RETAINER OR CLAMP FOR A CYLINDRICAL TYPE HEATER
Filed March 18, 1968    4 Sheets-Sheet 1

INVENTOR:
GEORGE B. DESLOGE
BY Gravely Lieder & Woodruff
ATTORNEYS.

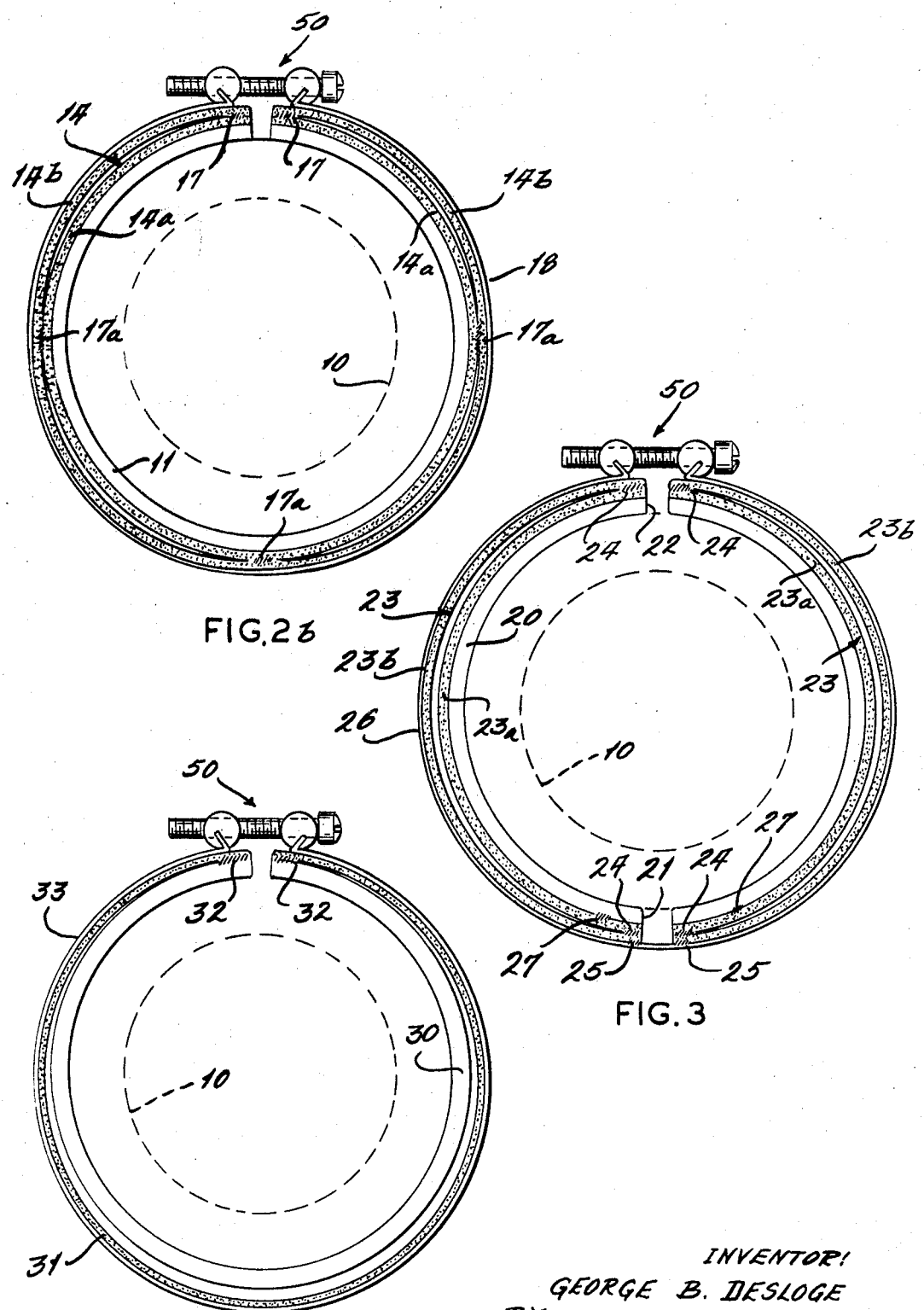

Oct. 28, 1969   G. B. DESLOGE   3,475,597
RETAINER OR CLAMP FOR A CYLINDRICAL TYPE HEATER
Filed March 18, 1968   4 Sheets-Sheet 4

INVENTOR:
GEORGE B. DESLOGE
BY
Gravely Lieder & Woodruff
ATTORNEYS.

United States Patent Office 3,475,597
Patented Oct. 28, 1969

3,475,597
RETAINER OR CLAMP FOR A CYLINDRICAL TYPE HEATER
George B. Desloge, St. Louis, Mo., assignor to Watlow Electric Manufacturing Company, St. Louis, Mo., a corporation of Missouri
Filed Mar. 18, 1968, Ser. No. 713,752
Int. Cl. H05b 3/58
U.S. Cl. 219—535          17 Claims

ABSTRACT OF THE DISCLOSURE

A structure for retaining a heater in close conforming relation with an object to be heated comprising an outer clamp band having approximately the same or lower coefficient of expansion than the cylinder being heated, and an intermediate filler band made up of two parts, the outside part having a relatively high coefficient of expansion, and the inside part having a low coefficient of expansion. These two parts of the filler band are effectively joined at the ends and also sometimes between the ends. The inner part (of the filler band) may be the sheath of the heater. As the heater is heated, the filler band effectively increases in thickness as a result of the difference in expansion of the two materials in the filler band, and this tends to cause the heater to remain in tight engagement with the cylinder to be heated.

A unique connector for the ends of the outer clamp band comprises parallel retaining members having angular slots into which the bent back ends of the clamp band are positioned and threaded fasteners between the retaining members, with the slots being so angled as to minimize bending moment on the fasteners and on the clamp band ends. The particular advantages of this clamp, besides its ability to pull ends together without distorting the clamp, are its clean low silhouette, its low cost, and its ability to be disengaged without removing the fastening screws.

BACKGROUND OF THE INVENTION

It is a problem in cylindrical heaters to retain the contacting relationship to the object to be heated (particularly at temperatures above 700° F.), because the heater, being the source of heat, gets hotter and expands away from the part heated. Once it loses contact it can no longer conduct heat and tends to get even hotter. Heretofore, this problem has been overcome by placing clamping bands around the heater which are of a lower expansion material than the heated cylinder. Such structure is shown in Desloge Patent No. 2,545,653. These devices are very satisfactory for temperatures up to about 700° F.; but at temperatures above 700° F., the expansion curve of the clamp band material rises sharply and the material also loses much of its tensile strength. Also, these low expansion materials are two to three times more costly than stainless steel.

It is a principal object of the present invention to provide a low cost temperature compensating clamping band for maintaining a heater in close contact with an object to be heated. It is also an object of the present invention to provide a unique connecting structure for pulling together the ends of the clamp band on the heater which has a low clearance, is easily disengaged and engaged, and which does not exert undue bending forces on the band or the clamp structure.

SUMMARY OF THE INVENTION

The present invention comprises a method and apparatus for retaining a heater against a cylindrical object to be heated utilizing a layered filler band made up of bands of different coefficients of expansion.

As the outer retaining band expands as it gets hotter, the filler band effectively increases in thickness, thus insuring good contact between the heater and the object to be heated. The invention further comprises the methods and apparatus hereinafter described and claimed.

DESCRIPTION OF THE DRAWINGS

In the drawings wherein like numbers refer to like parts wherever they occur:

FIG. 2b is a plan view similar to FIG. 2a showing a further modification where the filler band is joined at several points besides the ends;

FIG. 3 is a view similar to FIG. 2a showing a modification where the heater is in two pieces;

FIG. 4 is a view similar to FIG. 2a showing another modification where the heater forms part of the filler band;

FIG. 1 shows the invention applied to a cylindrical member 10 which represents the object to be heated and which may be a pipe on a plastic moulding machine or any other similar cylindrical object. The cylinder 10 generally is made of steel and, therefore, has a relatively low coefficient of expansion. A conventional heater 11 is positioned around the cylinder 10. The heater ends 12 are spaced apart to allow for movement with expansion as the element heats up. The terminal or leads 13 (used if the heater 11 is an electrical resistance heater) can be at any location on the heater 11.

Figure 1:
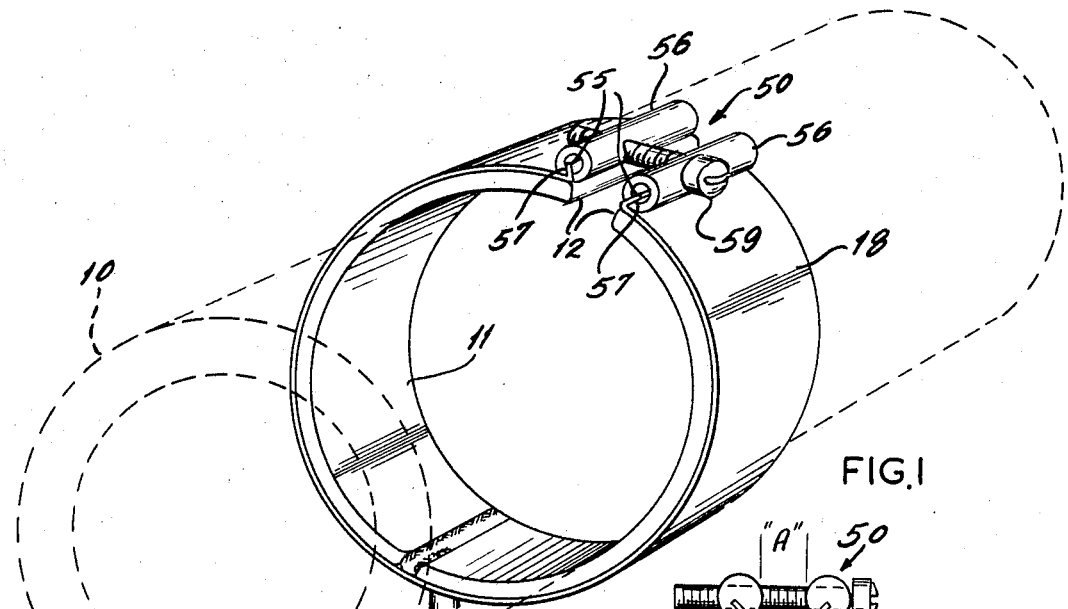
FIG. 1 is a perspective view of the invention applied to an electric heater on a cylinder.

Positioned adjacent to the outer surface of the heater 11 is a filler member 14 comprising an inner band 14a of low expansion material, such as steel or 430 Stainless steel, and an outer band 14b of high expansion material, such as 304 Stainless steel. The inner and outer bands 14a and 14b are fastened together at their ends by suitable means, such as welds 17. The outer band 14b can be fastened to the inner band 14a at a number of points between the ends if necessary to prevent their separation. (This is shown in FIG. 2b.) However, the bands 14a and 14b should be joined at the ends to get maximum advantage of the invention. Other methods of attaching the band ends together include riveting, or folding together.

Around the outer surface of the outer band 14b is a clamping band 18 which is formed of low expansion material, or material conforming to the expansion characteristics of the cylinder 10 to be heated.

The filler band 14 and the clamp band 18 are free to move with respect to each other in two directions. Therefore, expansion of the filler band 14, which is restrained in a radial direction by the lesser expansion of the clamp band 18, tends to effectively increase the diameter or thickness of the filler band 14 and retain the heater 11 in close contact with the cylinder 10 being heated. This also tends to move the heater ends 12 together inasmuch as the heater 11 is removable with respect to the cylinder 10. This is indicated by the decreased distance B of FIG. 2a as compared to the end spacing distance B of FIG. 2. FIG. 2a shows the effects of heating on the structure. The clamp connector spacing A is substantially the same before and after heating.

Figure 2:
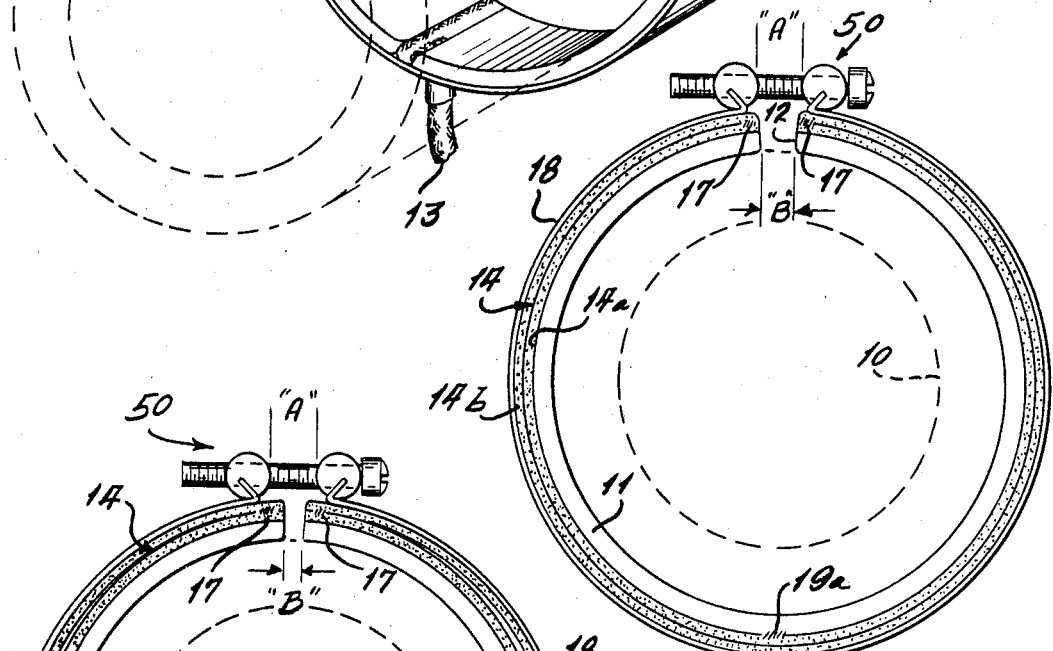
FIG. 2 is an end view partly schematic showing a first form of the invention.
Figure 2A:
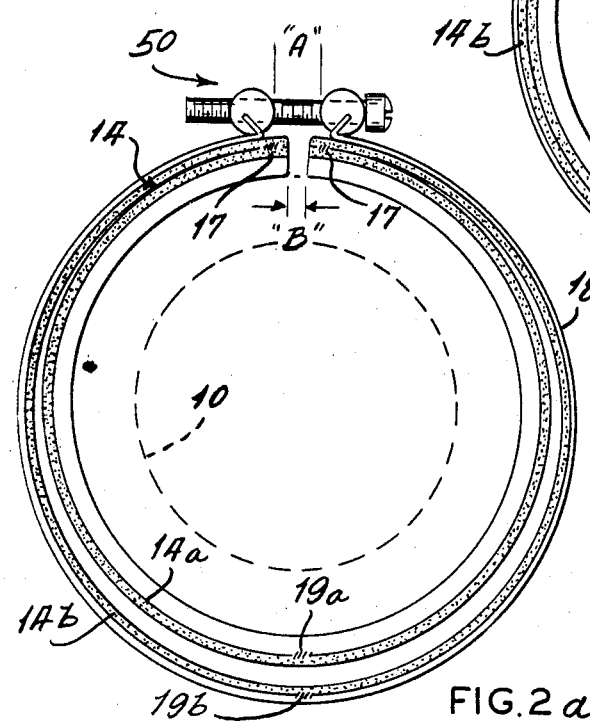
FIG. 2a is a view similar to FIG. 2 showing the operation of this invention schematically, the expansion being greatly exaggerated.

FIGS. 2 and 2a show schematically the effect of this invention. For purposes of discussion, the filler structure 14 can be thought of as being sandwiched between the heater 11 and the clamp band 18. When heated, the outer portion 14b of the filler 14 expands more than its inner part 14a. In its cylindrical shape, its outside diameter increases more than its inside diameter. With the outside diameter of the filler band 14 restrained by the clamping band 18, the effective increase in thickness transmits the restraining force to the heater 11 keeping it clamped snugly against the cylinder 10.

To maintain the unit as a complete assembly, the inner band 14a may be attached to the heater 11 at one point and the clamp band 18 may be attached to the band 14b at one point. This is indicated by the welds 19a and 19b in FIGS. 2 and 2a.

FIG. 2b shows a modification of the filler band 14 in which the high expansion band 14b is attached to the inner lower expansion band 14a at its ends 17 and at intermediate points 17a. This same structure can be used with the constructions of FIGS. 2, 2a, 3 and 4, using the parts shown in these figures.

FIG. 3 shows a modification which functions like the structure of FIGS. 2 and 2a in all respects except that the heater 20 is split at 21 opposite the free ends 22 to, in effect, give two semi-circular heaters positioned side-by-side. In this arrangement, the filler band also is made in two semi-circular sections 23. Each of the sections includes an inner low expansion band 23a and an outer high expansion band 23b fastened together at their ends 24. In addition, the clamp band 26 is fastened to the filler band 23 at 25 (as by welding) adjacent to the split in the heater at 21. This allows the clamp band 26 to act as a hinge, so that the entire arrangement can be bent open and positioned around the cylinder to be heated rather than being slid on from an end of the cylinder. To maintain the entire assembly together, the heater halves 20 are attached to the filler band 23 at one point 27 on each half.

FIG. 4 shows a practical economic form of the invention. The heater 30 has a metal outer sheath of a relatively low expansion material to which the ends of the high expansion band 31 are anchored at 32. Thus, the outer wall of the heater sheath serves the purpose of the inner band member 14a of the filler structure of FIGS. 2 and 2a and the member 23a of the structure of FIG. 3. The clamp band 33 is of low expansion material.

As a specific example of this invention, using the structure of FIG. 4 with a diameter of 10", and assuming the heater, filler, and clamp band at a temperature of 1000° F., if the sheath 30 and the clamp band 33 are of 430 Stainless steel, their expansion would be approximately 0.063" in diameter. The high expansion band member 31 made of 304 Stainless steel would expand approximately 0.102" in diameter. If the filler is thought of as one piece, it would increase in thickness approximately 0.020", with this being interposed between the sheath 30 and the band 33. Thus, the effective diameter of the sheath 30 is reduced by this amount to move it closer to a pipe which it surrounds.

While these specific materials are presently preferred, other materials can be used in this invention as long as the expansion charateristics of the bands forming the filler member differ.

To avoid shear stress on the points of attachment of the high expansion and low expansion materials, the high expansion band can be in strips, or the ends of the inner band (or heater sheath) can be turned over the ends of the high expansion member to clamp the two together against lengthwise movement and still compensate for shear stresses.

Figure 5A:
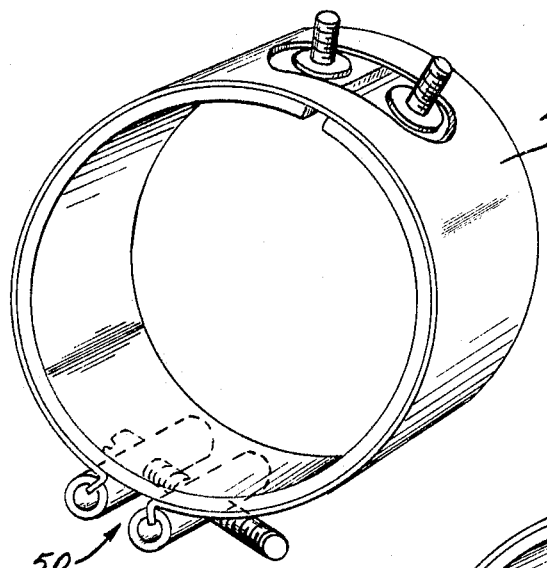
FIGS. 5a–c are fragmentary perspective views showing modified methods of forming terminals or leads.
Figure 5C:
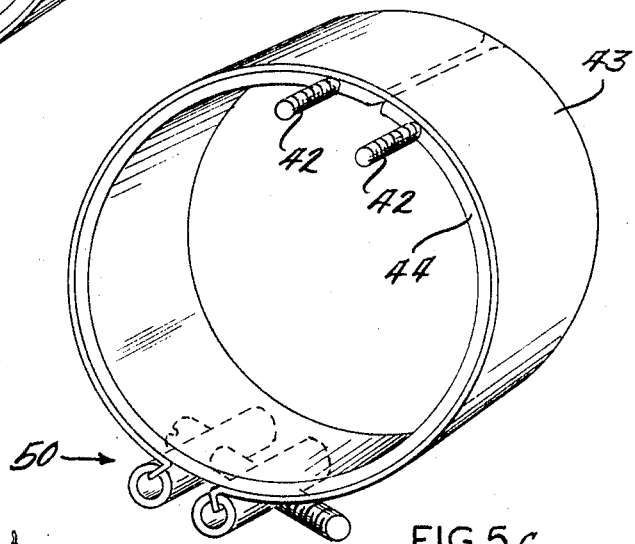
Figure 5B:
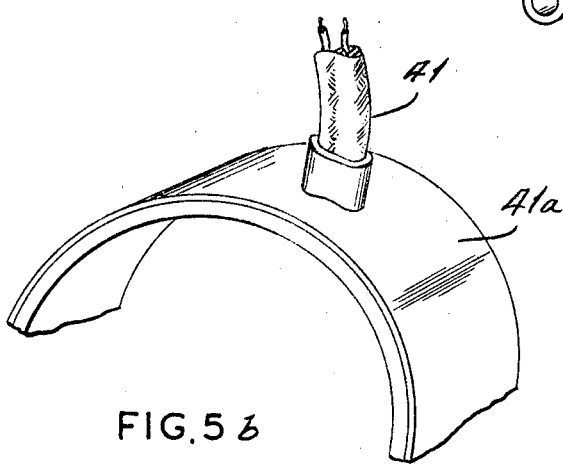
Figure 8:
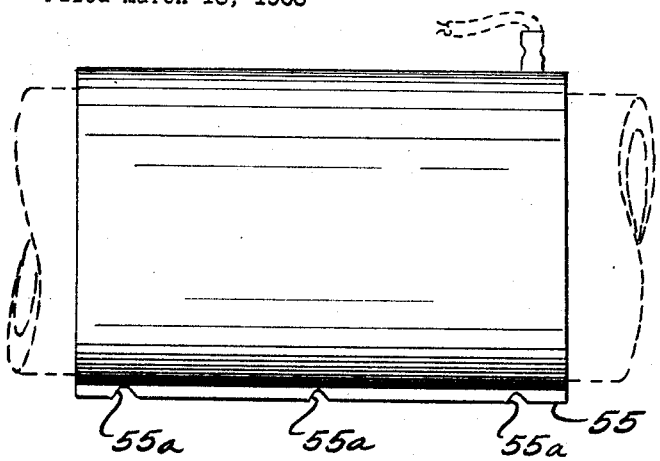
FIG. 8 is a side elevational view with the connector removed.

FIGS. 5a–c show different methods of providing exterior terminals or leads for this invention used on electric heaters. FIG. 5a shows a by-pass in the outer clamp band 40 which is similar to the structure shown in Desloge Patent No. 2,545,653.

FIG. 5b shows a lead opening 41 similar to the construction shown in FIG. 1. In this construction the leads are from the ends or the outer surface of the heater through the clamp band 41a.

FIG. 5c shows edge terminals 42 which pass beneath the clamp band 43 (and the filler member) from the edge of the heater 44.

OUTER BAND CLAMP STRUCTURE

Figure 9A:
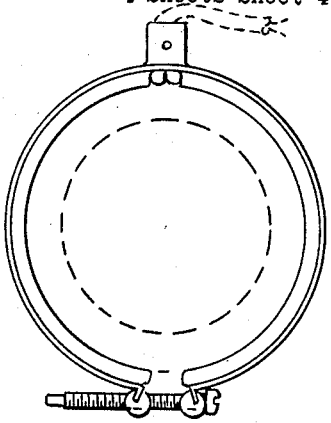
FIG. 9a is an end elevational view showing the heater of FIG. 9 positioned on the pipe.
Figure 7:
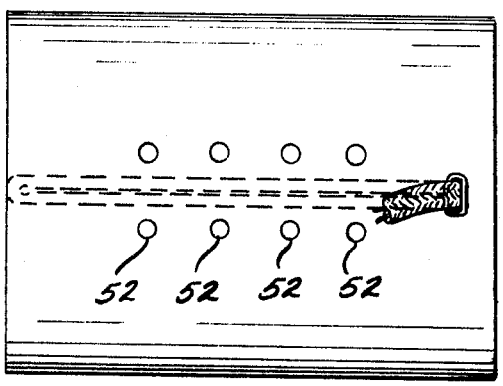
FIG. 7 is a bottom view.
Figure 9:
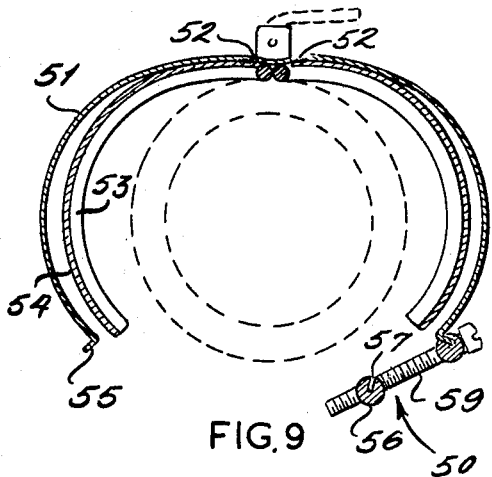
FIG. 9 is a vertical sectional view of the invention with the clamp and heater opened up and the heater shown in full lines showing application of the heater to a pipe (shown in phantom lines)
Figure 6:
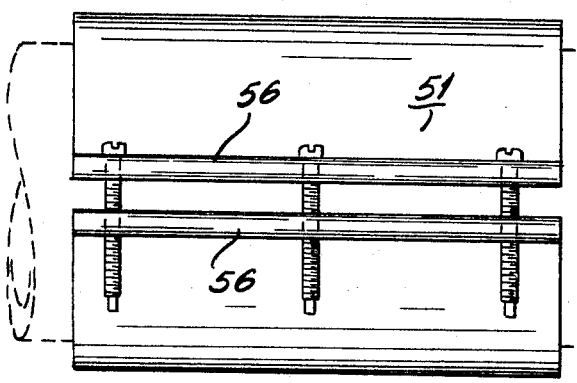
FIG. 6 is a plan view showing the invention applied to a pipe (shown in phantom lines)

In all of the structure shown, a unique clamp construction 50 is used, although any type can be used. This clamp structure also can be used with the clamp arrangement of Desloge 2,545,653. FIGS. 6, 9 and 9a show this clamp in detail and will be used for purposes of illustration.

The clamp band 51 is secured at 52 to the sheath of the heater 53. The intermediate band 54 is secured to the heater sheath at its ends. The heater 53 is divided into two sections as described in FIG. 3 and the heater sheath acts as the inner low expansion member as described in FIG. 4.

The free ends 55 of the clamp band 51 are spaced from each other and are bent back on themselves away from each other. The ends 55 are bent more than 90° from their original position.

The unique clamp mechanism 50 comprises spaced parallel retaining members 56, which generally are circular in cross-section and may be solid rods (FIGS. 6, 9 and 9a) or tubular members (FIG. 1). Slots 57 are formed in the retaining members 56 and are angularly positioned therein to accommodate the clamp band ends 55. The slots are generally positioned at an angle of about 40° to about 80° with respect to the horizontal center line of the screw members 59 and are positioned into the lower half of the retaining members 56. Threaded lateral openings 58 are provided through the retaining members 56 to receive the screw means 59 which are used to draw the clamp band ends 55 together. The angles of the slots 57 are such that little bending moment is exerted against the clamp band ends 55 and the clamping force tends to urge the ends 55 together, thus assisting in retaining the heater 53 against the cylinder being heated. In an elongated clamping band 51, a number of screws 59 are positioned along the length of the retaining means 59 because the low profile of the clamp 50 means the screws 59 are close to the clamp band 51. The band ends 55 are notched at 55a where the fastening screws 59 pass to further lower the screw 59 to the cylinder being heated.

The foregoing described clamp can also be used with the heater band shown in Patent No. 2,545,653.

Among the advantages of the particular clamp structure are the closeness of the fastening screw to the clamp band which reduces the bending movement on the screw. It also is more suitable for practical application because it is close to the pipe and does not cause a clearance problem in use. The clamp is a low cost item and is attractive and is easy to hook onto the clamp band. There is no lift on the band caused by bending forces and the ends of the bands are provided with a simple bend rather than U-shaped or other radiused bends.

The easy hooking action of the clamp is illustrated in FIG. 9 which shows the retainer band 51 spread. To attach the clamp 50 to the retainer band 51, the band ear 55 is positioned in a slot 57 on one of the rods 56. Then the other rod 56 merely can be turned up easily. As there is considerable tension in the band 51, it would be difficult to align the screw and opening while holding the band ends together if it were not for the snap-in effect of the present clamp.

Figure 10:
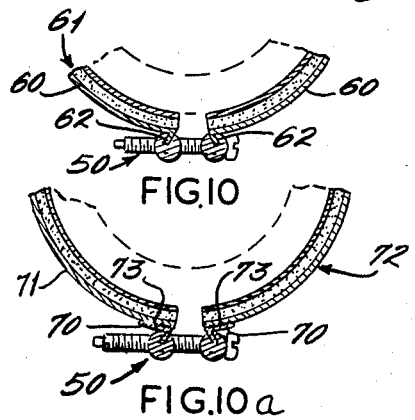
FIG. 10 is a fragmentary view partly in section of a modification of the clamp and connecting means.

FIG. 10 shows a modification of the clamp and connecting means wherein the outer side 60 of a sheathed heater 61 is extended and bent back to form the end margins 62 which are engaged by the connecting means 50.

Figure 10A:
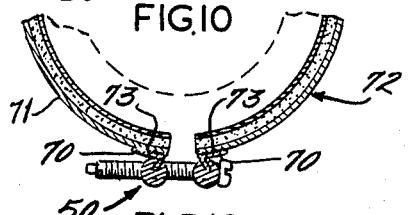
FIG. 10a is a similar view of another modification.

FIG. 10a shows another modification wherein separate margin members 70 are fastened to the outer surface 71 of a sheathed heater 72 as by welds 73 and are engaged by the connecting means 50.

Thus, it is apparent the present invention achieves all the objects and advantages sought therefor.

This invention is intended to cover all changes and modifications of the example of the invention herein chosen for purposes of the disclosure, which do not constitute departures from the spirit and scope of the invention.

What is claimed is:

1. A two piece clamp structure in a cylindrical electric heater comprising:
   (a) an inner cylindrical filler member closer to the heater, said member itself being made of two elements, the element closer to the heater being a low expansion material and the other a high expansion material, said elements being fastened together in at least two places to prevent relative circumferential movement therebetween, and
   (b) an outer cylindrical clamp band positioned around said filler member to limit expansion therof.

2. The structure of claim 1 wherein the inner element of the filler is a portion of the sheath of the heater.

3. The structure of claim 1 wherein the filler elements are fastened together at their ends.

4. The structure of claim 3 wherein the filler elements also are fastened together between their ends.

5. The structure of claim 1 wherein the heater is separated into adjacent facing section, and the heater, filler member, and clamp band are secured together adjacent to said separation to provide a hinge effect whereby the heater can be opened up and slipped over the object to be heated.

6. The structure of claim 1 wherein the outer clamp band is split and including clamp means engaged with the opposed ends of the band to retain the band tightly against the filler.

7. The structure of claim 6 wherein the band ends are bent back on themselves and wherein the clamp means comprises elongated parallel retaining members having opposed facing slots formed therein at an angle such that the force exerted on the forward end of the clamp band is directed into the inside corner of the bend in the band and thus toward pulling the ends of the band together and toward the heater, and fastening means positioned through the retaining members to pull the retaining members toward each other.

8. The structure of claim 7 wherein the retaining members are substantially circular and hollow and the fastening means is threadedly engaged with the retaining members.

9. In a clamp means for a split ring type heater having means connecting the ends of the clamp means to retain the heater around the object to be heated, the improvement which comprises opposed backwardly bent end margins at the ends of the clamp means, said margins being turned away from each other and directly backwardly over and away from the main body of the heater, connector means comprising opposed substantially parallel retaining members having opposed slots running longitudinally thereof, said slots being formed at an angle corresponding to the angle of margins and opening outwardly to accommodate said margins, and fastening means passing through said retaining members at about the centers for exerting a closing force on the retaining members so as to draw the opposed retaining members and the backwardly bent margins therein toward one another, the line of action of the closing force being oblique to the slots and to the backwardly bent margins whereby little lift is exerted on the clamping means when the fastening means are tightened and little bending moment is exerted on the fastening means.

10. The structure of claim 9 wherein the retaining means are rods and the fastening means are threaded to the rods.

11. The structure of claim 9 wherein the retaining means are tubes and the fastening means is threaded thereto.

12. The structure of claim 9 wherein the end margins are provided with cut-out portions through which the fastening means pass to position the fastening means closer to the main body of the heater.

13. The structure of claim 9 wherein the end margins are connected to a band which encircles the heater.

14. The structure of claim 13 wherein the band is a portion of the heater sheath.

15. The structure of claim 9 wherein the end margins are fastened to the outer sheath of the heater.

16. The structure according to claim 9 wherein the fastening means are screws, and wherein the retaining members are provided with bores through which the screws extend, whereby the screws resist bending moments and the angles between the slots will not change as the retaining members are drawn toward one another by the screws.

17. The structure according to claim 13 wherein the end margins extend directly outwardly from the band; wherein the retaining members are provided with bores and engage the end margins up to the surface of the band, and wherein the fastening means are screws which extend through the bores whereby the screws resist the bending moment.

References Cited
UNITED STATES PATENTS

| | | | |
|---|---|---|---|
| 1,312,554 | 8/1919 | Logan | 219—535 |
| 2,599,882 | 6/1952 | Adams | 24—279 |
| 2,713,352 | 7/1955 | Schustack. | |
| 2,851,577 | 9/1958 | Bolds et al. | 219—535 X |
| 2,959,661 | 11/1960 | Bothwell et al. | 219—535 X |
| 2,987,599 | 6/1961 | Voss | 219—535 |
| 2,992,314 | 7/1961 | Drugmand et al. | 219—535 |
| 3,089,212 | 5/1963 | Graham et al. | 24—279 |
| 3,195,206 | 7/1965 | Morriss | 24—279 |
| 3,209,427 | 10/1965 | Smith et al. | 24—279 |
| 3,254,387 | 6/1966 | Smith | 24—279 |

VOLODYMYR Y. MAYEWSKY, Primary Examiner

U.S. Cl. X.R.

24—279; 138—33; 165—181; 219—456, 537